(12) United States Patent
Kamal (10) Patent No.: US 10,454,872 B2
(45) Date of Patent: Oct. 22, 2019

(54) GROUP EMAIL MANAGEMENT

(71) Applicant: Microsoft Technology Licensing, LLC, Redmond, WA (US)

(72) Inventor: Raj Kamal, Hyderabad (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 63 days.

(21) Appl. No.: 14/745,725

(22) Filed: Jun. 22, 2015

(65) Prior Publication Data
US 2016/0373392 A1    Dec. 22, 2016

(51) Int. Cl.
| G06F 15/16 | (2006.01) |
| H04L 12/58 | (2006.01) |
| H04L 29/12 | (2006.01) |
| G06Q 10/10 | (2012.01) |

(52) U.S. Cl.
CPC .......... *H04L 51/22* (2013.01); *G06Q 10/107* (2013.01); *H04L 51/12* (2013.01); *H04L 61/1564* (2013.01)

(58) Field of Classification Search
USPC .......................................................... 709/206
See application file for complete search history.

(56) References Cited

U.S. PATENT DOCUMENTS

| 5,930,511 A * | 7/1999 | Hinsley ............... G06F 8/45 717/164 |
| 6,078,945 A * | 6/2000 | Hinsley .............. G06F 9/5088 718/102 |
| 6,226,630 B1 * | 5/2001 | Billmers .............. G06F 16/353 |
| 6,374,292 B1 * | 4/2002 | Srivastava ....... H04L 29/12066 709/206 |
| 6,557,036 B1 * | 4/2003 | Kavacheri .......... G06F 11/3414 709/206 |
| 6,704,772 B1 | 3/2004 | Ahmed et al. |

(Continued)

FOREIGN PATENT DOCUMENTS

| WO | 2001065336 A2 | 9/2001 |
| WO | 2001067305 A1 | 9/2001 |

OTHER PUBLICATIONS

"International Search Report and Written Opinion Issued in PCT Application No. PCT/US2016/038588", dated Aug. 23, 2016, 10 Pages.

(Continued)

*Primary Examiner* — Alicia Baturay
(74) *Attorney, Agent, or Firm* — Michael Best & Friedrich LLP (57) ABSTRACT

Systems and methods for providing an enhanced managed email service are provided. According to the disclosed subject matter, the enhanced managed email service maintains a group folder for each defined email group. Rather than delivering a received email to the email folder of each member of an email group, upon receiving an email for distribution to a defined email group, the enhanced managed email service stores the email in a group folder corresponding to the email group for the entire email group. Email specifically identifying one or more recipients (in addition to group membership) is delivered to the specifically identified recipient(s). The enhanced managed email service maintains user access status with regard to the email in the group folder for each of the members of the email group. Email group members may access the email via the group folder.

20 Claims, 10 Drawing Sheets

(56) References Cited

U.S. PATENT DOCUMENTS

| | | | |
|---|---|---|---|
| 6,865,594 B1 * | 3/2005 | Belissent | H04L 29/12066 709/206 |
| 7,058,683 B1 * | 6/2006 | Belissent | H04L 51/14 709/206 |
| 7,277,901 B2 * | 10/2007 | Parker | G06Q 10/10 |
| 7,290,034 B2 | 10/2007 | Budd et al. | |
| 7,596,594 B2 * | 9/2009 | Karp | G06Q 10/107 707/999.001 |
| 7,693,940 B2 * | 4/2010 | Carmel | G06F 17/279 709/203 |
| 7,774,411 B2 * | 8/2010 | LeMay | H04L 63/045 709/206 |
| 7,797,386 B2 * | 9/2010 | Burns | H04L 51/12 370/401 |
| 7,831,676 B1 | 11/2010 | Nagar | |
| 7,912,913 B2 | 3/2011 | Accapadi et al. | |
| 8,010,613 B2 * | 8/2011 | Oral | G06Q 10/107 709/203 |
| 8,112,478 B2 * | 2/2012 | Carrer | G06Q 10/107 709/204 |
| 8,171,061 B2 * | 5/2012 | Greatwood | G06F 17/30067 707/821 |
| 8,250,150 B2 | 8/2012 | Beck et al. | |
| 8,433,797 B2 * | 4/2013 | Vendrow | H04L 65/1006 709/224 |
| 8,468,168 B2 * | 6/2013 | Brezina | H04M 15/00 707/783 |
| 8,675,831 B2 * | 3/2014 | Cai | H04L 51/30 379/88.12 |
| 8,819,120 B1 | 8/2014 | Wang et al. | |
| 8,868,668 B2 * | 10/2014 | Hopper | G06Q 10/107 709/206 |
| 8,930,379 B2 | 1/2015 | Baude et al. | |
| 8,931,057 B2 * | 1/2015 | Cicchitto | G06F 21/604 726/4 |
| 9,313,207 B2 * | 4/2016 | Cicchitto | G06F 21/604 |
| 9,367,257 B2 * | 6/2016 | Hamilton | G06F 3/0604 |
| 9,497,152 B2 * | 11/2016 | Caldwell | G06Q 10/107 |
| 9,542,668 B2 * | 1/2017 | Gilad | G06Q 10/107 |
| 9,571,657 B2 * | 2/2017 | Sherlock | H04M 3/42238 |
| 2002/0087646 A1 * | 7/2002 | Hickey | G06Q 10/10 709/206 |
| 2004/0078447 A1 * | 4/2004 | Malik | G06Q 10/107 709/206 |
| 2005/0080863 A1 | 4/2005 | Daniell | |
| 2009/0132490 A1 | 5/2009 | Okraglik | |
| 2009/0198785 A1 | 8/2009 | Uchiyama et al. | |
| 2010/0064231 A1 | 3/2010 | Gupta | |
| 2013/0212200 A1 * | 8/2013 | Dennis | H04L 51/22 709/206 |
| 2015/0235158 A1 * | 8/2015 | Rungta | G06Q 10/06316 705/7.15 |
| 2016/0269333 A1 * | 9/2016 | Kumar | H04L 51/16 |
| 2016/0269341 A1 * | 9/2016 | Kumar | H04L 51/24 |

OTHER PUBLICATIONS

"MDaemon Messaging Server—Email Server", Published on: Feb. 20, 2013 Available at: http://www.altn.com/Products/MDaemon-Email-Server-Windows/MDaemon-Email-Server/#PublicFolderManager.

"Chapter 20 Managing the Message Store", Retrieved on: Feb. 23, 2015 Available at: http://docs.oracle.com/cd/E19563-01/819-4428/bgavo/index.html.

"International Preliminary Report on Patentability Issued in PCT Application No. PCT/US2018/038588", dated Jun. 8, 2017, 7 Pages.

\* cited by examiner

GROUP EMAIL MANAGEMENT

BACKGROUND

More and more, computer users (people who use a computer or computing device) are using email as a significant channel of communication. Further, computer users often subscribe and/or are admitted to various email groups to receive emails distributed to the email group members for a variety of reasons including personal interest, business purposes, familial communications, and the like. Often, a computer user will create one or more rules regarding the receipt of emails received via a group distribution. These rules may include associating priorities for emails for certain groups, sorting and moving the various emails into folders corresponding to a particular group, and the like.

For the computer user that joins an email group, it is often surprising the number of emails that he/she will receive due to membership in the email group. Quite often, the volume of email associated with an email group feels more like "spam" than valuable information. Unfortunately, reading and sorting through all of the email associated with a group, determining which item of email requires action and which is simply informative (or worse), requires a substantial investment of individual time and resource. For example, quite often a computer user will wish to further investigate a matter if he/she is specifically identified in an email, rather than referentially identified due to membership in an email group. If the computer user is identified in the "To:" or "CC:" or "BCC:" lists, the computer user may be more motivated to read and respond to an email, assuming that the sender specifically identified the computer user to receive (and act upon) the email.

For those computer users that are part of one or more email groups that are computer/email savvy, it is up to them to configure email rules to move, organize and classify received emails distributed according to a group distribution into appropriate folders. However, not all computer users are familiar enough with their email system to define rules to help organize the flow of email, especially email associated with a defined email group. For these, whenever an email is sent to a group that email appears in the personal Inbox of a group member, along with other emails. Further still, while individually configured email mail rules go some way in addressing organizational issues, in this circumstance the onus is on the users rather than the email server.

In addition to forcing each user to create and/or configure rules for managing group emails (if desired), when an email is received that identifies a group as a recipient, the email is distributed to (and therefore duplicated) every group member's email inbox. This duplication to all members of a group translates to wasted disk space at the server and lost processing bandwidth from duplicating the file to the various group members.

Further still, group membership is often dynamic. Indeed, it is unreasonable to assume that a group's membership will not grow: i.e., add new members. Currently, when a member joins an email group, the new user's "membership" in a group is only effective from the date on which that user joins the group: i.e., the new group member cannot refer those emails sent to the group prior to his/her joining the group. The work-arounds are cumbersome: an earlier joined (or original) member of the group could forward any important previously-sent emails, or the new member can try to peruse emails to examine the thread leading up to the email to obtain the required information (such as background, etc.)

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems, computer-readable media, and methods for providing an enhanced managed email service are provided. According to at least one embodiment of the disclosed subject matter, the enhanced managed email service maintains a group folder for each defined email group. Rather than delivering a received email to the email folder of each member of an email group, upon receiving an email for distribution to a defined email group, the enhanced managed email service stores the email in a group folder corresponding to the email group for the entire email group. The enhanced managed email service maintains user access status with regard to the email in the group folder for each of the members of the email group. Email group members may access the email via the group folder.

According to additional aspects of the disclosed subject matter, a method for managing email directed to a defined email group on an enhanced managed email service is presented. Upon receiving an email for distribution to recipients managed by the enhanced managed email service, the enhanced managed email service determines whether the email is directed to an email group managed by the enhanced managed email service. After determining that the email is, in fact, directed for distribution to an email group managed by the enhanced managed email service, the email is stored in a group folder common to the members of the email group. Those members of the email group that are referentially-identified by the email (i.e., are members of the email group) have access to the received email via the group folder.

According to further aspects of the disclosed subject matter, a computer-readable medium bearing computer-executable instructions for carrying out a method for managing email directed to a defined email group is presented. Upon receiving an email for distribution to recipients managed by the enhanced managed email service, the enhanced managed email service determines whether the email is, at least in part, directed to an email group managed by the enhanced managed email service. After determining that the email is, in fact, directed to an email group managed by the enhanced managed email service, the email is stored in a group folder common to the members of the email group. The email is stored in the group folder such that the members of the email group have access to the received email via the group folder. Further, the enhanced managed email service sets an initial user access status for the received email in the group folder for each of the members of the email group.

According to still further aspects of the disclosed subject matter, a computer system implementing an enhanced managed email service is presented. The computer-system includes a processor and a memory, wherein the processor executes instructions stored in the memory as part of or in conjunction with additional components provide functionality of the enhanced managed email service. These additional components include an email service component and a group email data store. In operation, the email service component is configured to, upon receiving an email directed to recipients managed by the enhanced managed email service, determine whether the received email is directed to an email group managed by the enhanced managed email service. After determining that that the email is, in fact, directed to an email group managed by the enhanced managed email service, the enhanced managed email service stores the email in a group folder common to the members of the email group in the group email data store. Members of the email group that are referentially-identified (i.e., via the email group) by the received email have access to the received email via the group folder. The enhanced managed email service further sets an initial user access status for the received email in the group folder for each of the members of the email group.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity and definition, the term "exemplary," as used in this document, should be interpreted as serving as an illustration or example of something, and it should not be interpreted as an ideal and/or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, with regard to a record that may list one or more web sites, the term "email(s)" should be interpreted in the context of an inbox: that there may be a single email in an inbox or that there may be plural emails in the inbox.

The term "managed email service" (also referred to as a hosted email service) corresponds to an email service that maintains, manages, and/or hosts the emails for subscribing email users at a centralized location (a logical centralized location as the actual physical location of the email host may be distributed across multiple computing devices). With regard to a managed email service, an email user by way of an email client communicates with the managed email service to act on his/her email (e.g., read an email, delete an email, move an email to another folder, reply, forward, etc.) Examples of managed email services predominantly include, by way of illustration but not limited to, IMAP (Internet Message Access Protocol) email servers, and Microsoft Exchange email servers (using the MAPI [Messaging Application Programming Interface] protocol).

For purposes of definition, the term "group email" (in contrast to an "email group") is an email directed to an email group. In contrast to a "group email," the term "email group" refers to a predetermined set of email users that are members of a defined group. The members of the email group are said to be "subscribed" to the group. The email group is identified by a unique email address just as an email account for an email user is identified by a unique email address. For example, the group email address of an illustrative managed email service, "examplegroup.com," may be "pearlcoregroup," and the members of the "pearlcoregroup" group may include any number of users/members. It is not a requirement that the subscribed members of a group be of the same domain as the group. For example, a member of the example "pearlcoregroup" group may include a subscribed user whose email is hosted by another email service (i.e., other than "examplegroup.com"). Further still, an email group may be a subscribed member another email group, e.g., an exemplary email group, "testingpearlcore," may be a subscribed member of the "pearlcoregroup" email group.

For purposes of definition, the term "specifically-identified user" corresponds to an email address (which may correspond to a person or a defined email group) that is specifically identified as a recipient in a email. The specifically-identified recipients include those user (or email group) identifiers that are specifically identified in one or more distribution lists of the email. These distribution lists typically include a "To list", a "CC list" (also euphemistically referred to as the carbon-copy list), and a "BCC list" (euphemistically referred to as the blind carbon-copy list.) As those skilled in the art will appreciate, the most significant difference between the users listed in the CC list and the BCC list is that the distribution of the email to members of the BCC list is (at least initially) hidden from the recipients of the email while information regarding the members listed in the CC list is available to the email recipients. In contrast to the specifically-identified user(s), a "referentially-identified user" corresponds to an email address (which may, again, correspond to a person or a defined email group) that is identified referentially, i.e., distributed to the email address due to a subscription to a group. For example, the user corresponding to the email address "carrie@examplegroup.com" may be a subscribed member of the "pearlcoregroup" email group. In this example, the email address "carrie" would be "referentially-identified user" of an email sent to the group email address pearlcoregroup@examplegroup.com.

For purposed of definition, the term "folder" refers to a collection or organization of content. The term folder is an allusion to a physical folder in which multiple items can be inserted and the whole can be viewed as contents of the folder. Thus, a "folder," in regard to an enhanced managed email service, corresponds to a collection of email items (which may include email, attachments, and/or other data) corresponding to a specific email address (which may correspond to a user or an email group).

According to aspects of the disclosed subject matter, an enhanced managed email service is presented. In contrast to typical managed email services, the enhanced managed email service is configured such that, upon receipt of an email directed to an email group, the enhanced managed email service stores the received email in a folder associated with the email group. Further still, the enhanced managed email service maintains a status for each member of the email group with regard to each item of email in the folder. Upon receiving an email directed to the email group, the initial status of email for each member of the email group is typically set to an "unread" status. Additional features of an enhanced managed email service are presented below.

Figure 1:
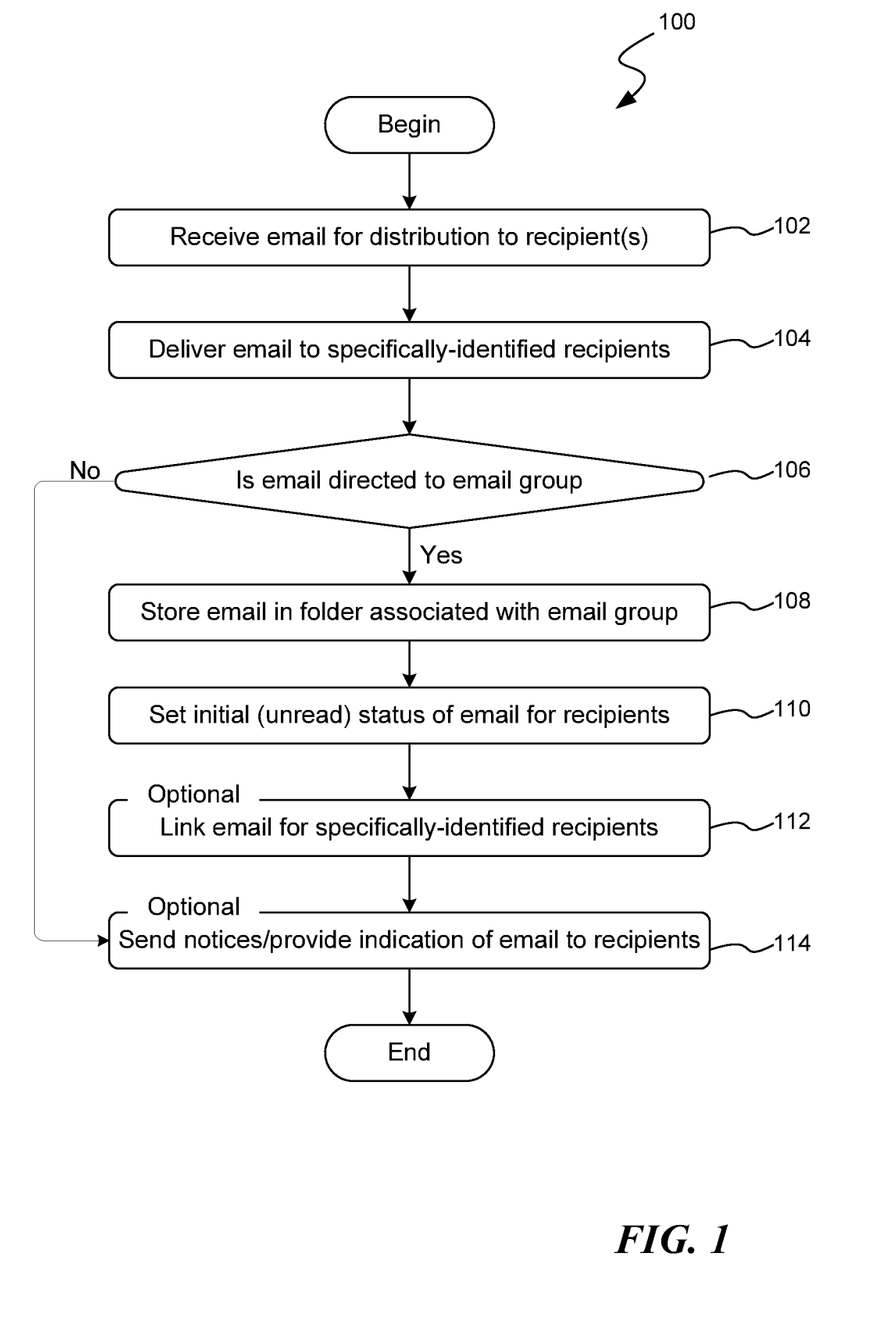
FIG. 1 illustrates an exemplary routine, as implemented by an enhanced managed email service.
Figure 2:
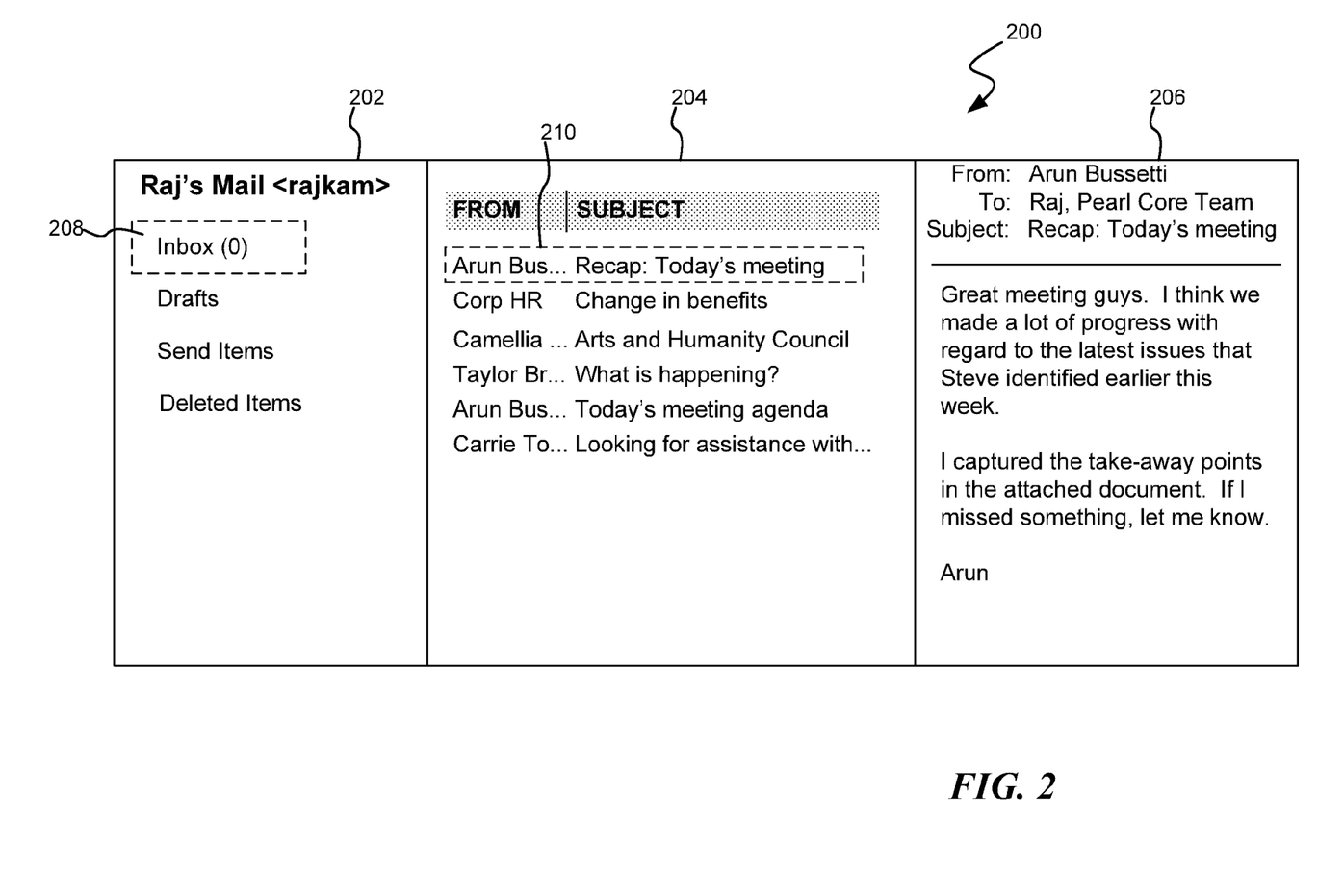
FIGS. 2, 3, 4 and 5A-5C illustrate an exemplary user interface of an email client in regard to receiving email according to aspect of the disclosed subject matter.

In regard to managing received email and in accordance with aspects of the disclosed subject matter, FIG. 1 illustrates an exemplary routine 100, as implemented by an enhanced managed email service, for managing group emails is presented. Beginning at block 102, the enhanced managed email service receives an email for distribution to recipients managed by the enhanced managed email service. At block 104, the enhanced managed email service identifies the specifically-identified recipients, excepting any defined groups, and delivers the received email to their inbox.

While a typical managed email service would also identify the members off any emails groups that are identified within the delivery lists, the enhanced managed email service does not. Instead, according to aspects of the disclosed subject matter, at decision block 106, a determination is made by the enhanced managed email service as to whether the received email identifies (i.e., is directed to) any email group that is managed by the enhanced managed email service. If there is not email group identified as a recipient, the routine 100 proceeds to block 114 as described below. However, in the alternative, if there is an email group identified as a recipient, the routine 100 proceeds to block 108.

At block 108, the enhanced managed email service stores the received email (including any attachments and related content/data) in an email folder associated with the identified email group. As indicated above, in contrast to storing a copy of the received email in each inbox (which is also a folder) of each member of the identified email group, a single copy of the email is stored in the email folder associated with the identified email group. Moreover, each member of the email group has the ability to access the group's email folder (subject to any rights access that may be implemented).

According to aspects of the disclosed subject matter, the enhanced managed email service tracks the access and/or status of each member of the email group with regard to the received email. Thus, at block 110, the enhanced managed email service sets the initial status (typically set to unread) for each of the email group members with regard to the received email.

As those skilled in the art will readily appreciate, there are times that an email is specifically directed to user who is also a member of an email group, which email group is also a recipient of the email. In other words, with any given email, a specifically-identified user may also be a referentially-identified user. When this occurs, as indicated above, the received email is delivered to the inbox of the specifically-identified user. Additionally, the specifically identified user can access the email due to membership in the email group—and will have access to the email via a group folder common (i.e., commonly accessible) to the members of the email group, as described below. Thus, according to one embodiment of the disclosed subject matter, at block 112, the enhanced managed email service optionally establishes a link between the email delivered to the specifically-identified recipients and the email in the group email folder of the email group. This link is made for purposes of managing the status of the specifically-identified user with regard the received email. In this embodiment, if the user accesses the email via the user's inbox folder, the enhanced managed email service can update the status of the user's access in both the inbox folder as well as the group folder. Similarly, if the user accesses the email via the email group's folder, the enhanced managed email service can update the status of the user's access in both the user's inbox folder as well as the group folder. Of course, in another embodiment, an email delivered to a user's inbox folder may be viewed as a separate delivery and treated separated to that same email that is delivered to the email group's folder. The actual implementation of these may be determined according to implementation needs and determinations.

In addition to optionally linking the email in the email group's folder with the email delivered to the inboxes of the specifically-identified users, at block 114 a notice of the received email may be pushed out to the recipients (via the email clients of the various users) regarding the delivered email to the inboxes of the specifically-identified users as well as the email group folder of the referentially-identified users. Of course, in various embodiments, a notification to the email clients of the various users is not necessary as they email clients are (or may be) configured to periodically poll the enhanced managed email service regarding any updated to the various folders: inbox and group folders.

After updating the various folders/inboxes of the recipients (both the specifically-identified recipients and the referentially identified recipients), the routine 100 terminates.

While the routine 100 is described above in regard to a single email group, it should be appreciated that there may be multiple email groups identified in the distribution lists of a received email. Moreover, as indicated above, a member of an email group may also be another email group. Thus, steps 108-114 may be repeatedly executed in to process multiple email groups that are identified as recipients of an email.

In regard to the user's perception of an enhanced managed email service, FIGS. 2-5C illustrate an exemplary user interface of an email client as the user receives email, including receiving an email as a specifically identified user, receiving an email as a referentially identified user, and receiving an email as both a specifically identified user and a referentially identified user. Beginning with FIG. 2, the exemplary user interface 200 includes a folder pane 202 in which the various folders corresponding to the user are presented. As can be seen, the user's various folders include an "inbox" folder 208 which also indicates the number of unread emails, "0", in the user's inbox folder. For purposes of this example, the inbox folder 208 in the folder pane 202 is selected as indicated by the dashed lines. The user interface 200 also includes an email pane 204 that lists various items of email, such as email 210, that the user has received and that are stored in the user's inbox folder. For purposes of this example, the email 210 has been selected, as indicated by the dashed lines around the presentation of the email. Further presented in the exemplary user interface 200 is an email viewing pane 206. For purposes of this example, since the email 210 has been selected, the content of the email is presented in the email viewing pane 206.

Figure 3:
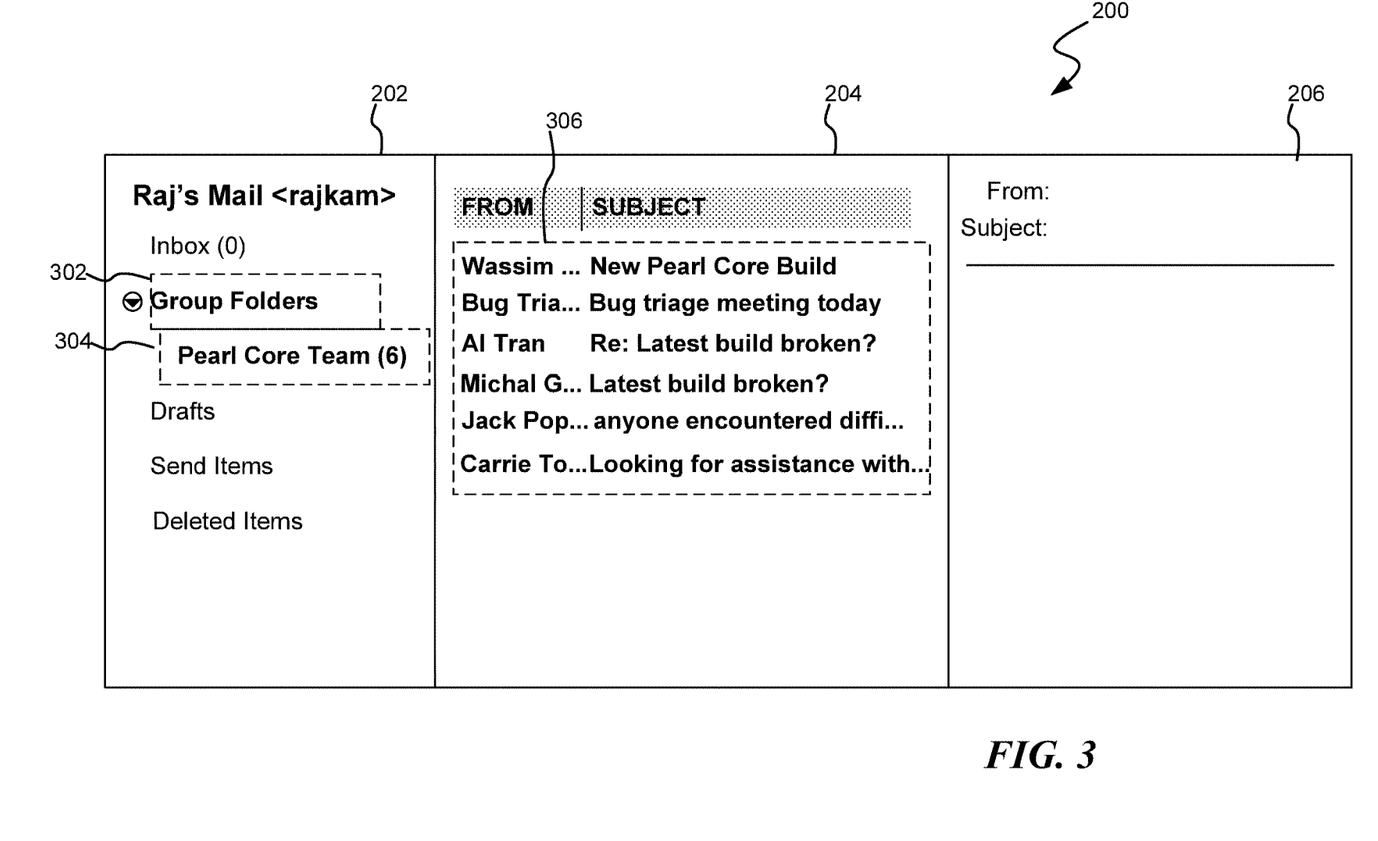

Turning to FIG. 3, for purposes of this example, the user has become a member of a defined group "Pearl Core Team." As shown in this figure, due to user becoming a member of the group, the exemplary user interface 200 now includes a "Group Folders" group folder 302 in the folder pane 202, and the group folder 302 includes a "Pearl Core Team" folder 304. Further still, as discussed above, with the inclusion of the user in the email group, emails within the email folder are available to the user and the user status with regard to the emails is typically set to unread. Thus, in this example the "Pearl Core Team" folder 304 indicates that there are six ("6") email items in the group folder that have not been read by the user. For purposes of this example, the email pane 204 illustrates the exemplary email items, as indicated by box 306. Further still, for purposes of this example, those email items that are unread are indicated in bold type.

Figure 4:
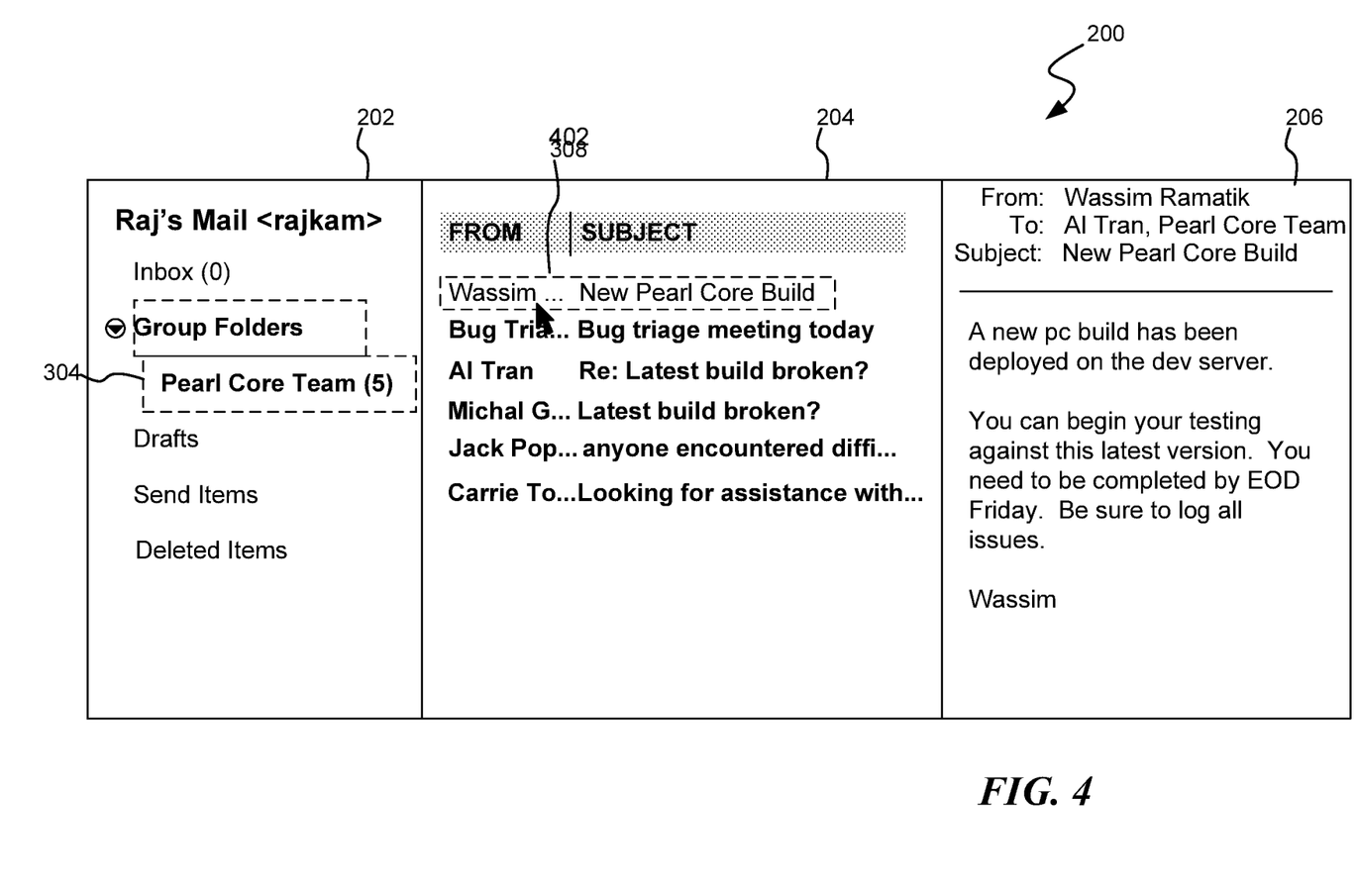

Turning to FIG. 4, for purposes of this example, the user has selected a first email 402 of the "Pearl Core Team" folder 304 and it is displayed in the email viewing pane 206. As can be seen, the number of unread email items in the "Pearl Core Team" folder 304 is now five ("5"), indicating that there are 5 email items in the folder that are not read. Of course, in contrast to any email items that are in the user's inbox folder 302, the email items in the group folders, such as the "Pearl Core Team" folder 304, are stored in a single folder corresponding to the email group (in this example the "Pearl Core Team" group) and managed for all email group members by the enhanced managed email service. Moreover, a first user's access status with regard to an email item, such as email 402, is independent of a second user's access status with regard to that same email item in the group folder. In other words, updating the user access status in the group folder corresponding to a first member of the email group does not modify the user access status in the group folder corresponding to a second member of the email group.

Figure 5A:
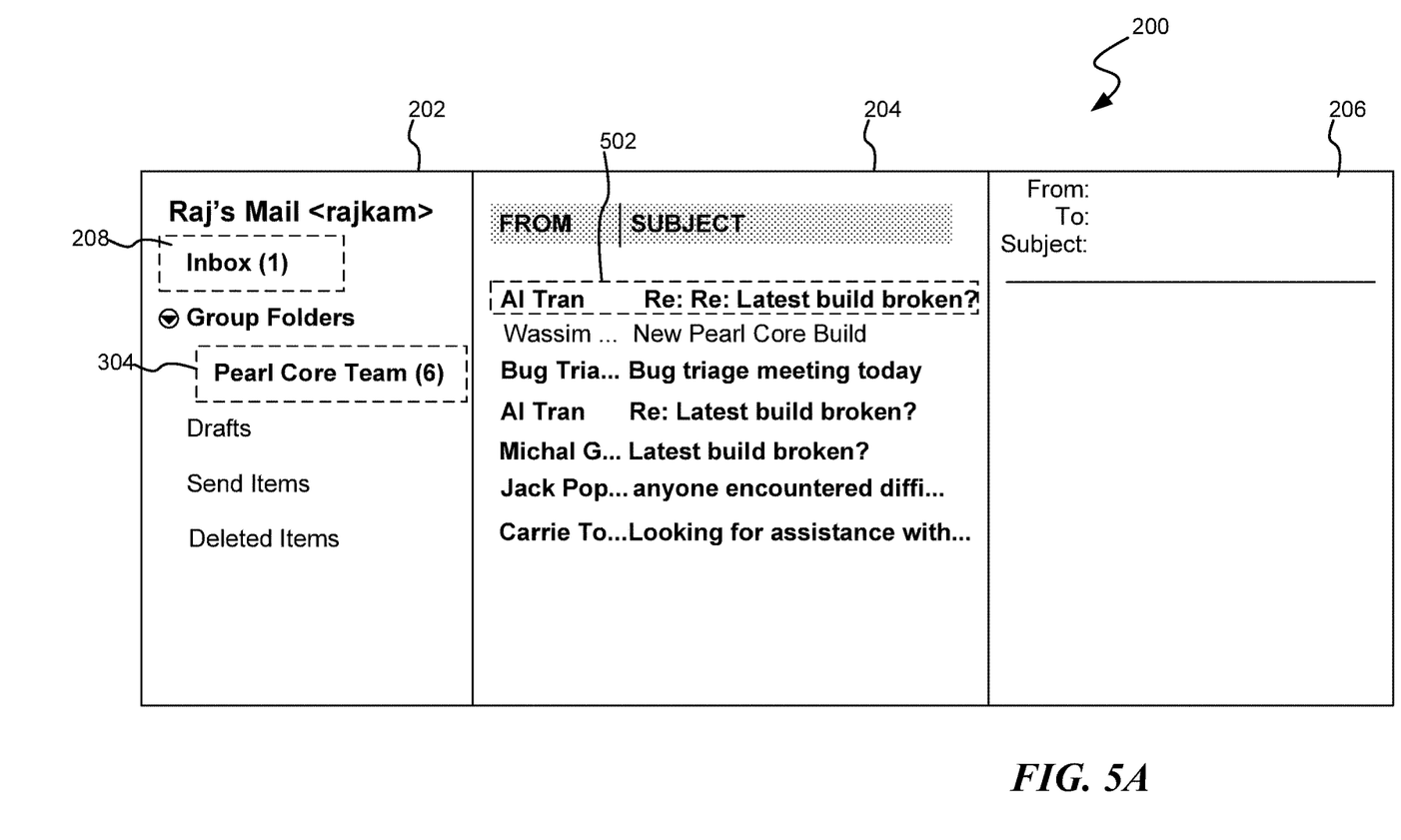
Figure 5B:
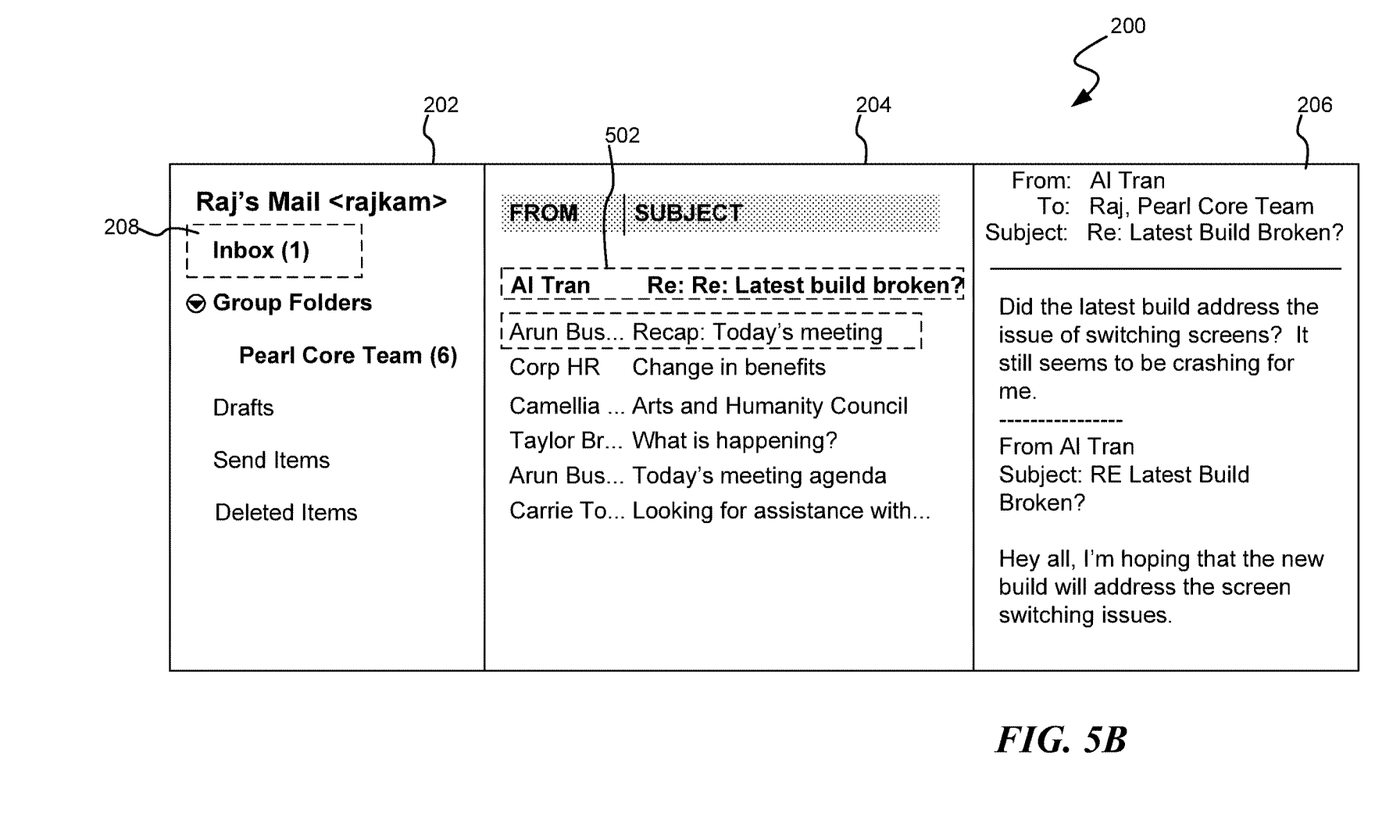
Figure 5C:
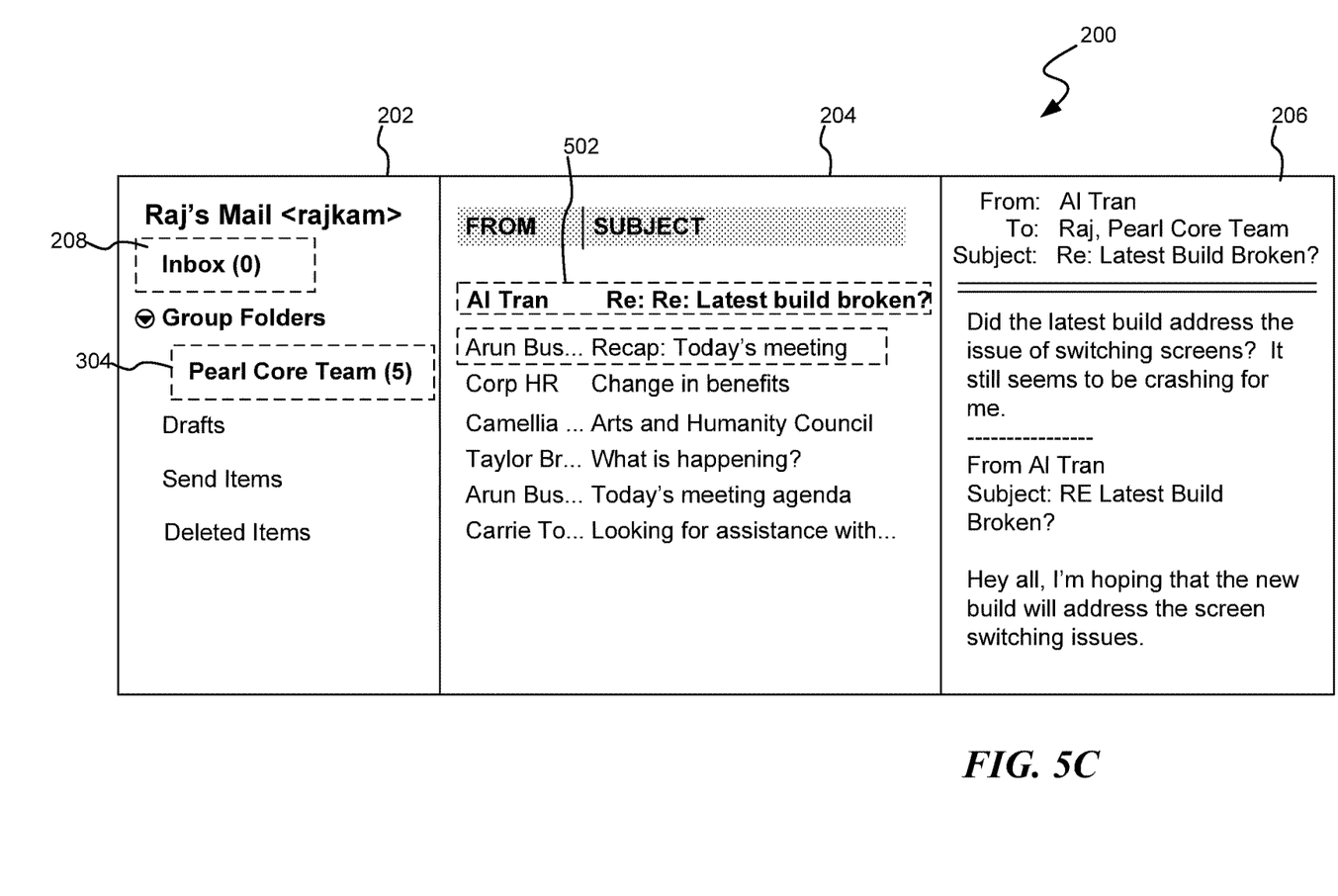

Turning to FIG. 5A, for purposes of this example, the user has received an email in which the user is both a specifically identified user and a referentially identified user. As show in the user interface 200, the "Pearl Core Team" folder 304 again has six unread emails, including the newly received email 502 (assuming, for this example, that the "Pearl Core Team" folder 304 is selected for display in the email pane 204.) Also shown is the user's inbox folder 208 that now indicates that an email has been received in the user's inbox. Turning to FIG. 5B, because the user was both a specifically identified user and a referentially identified user, the email 502 is also displayed in the user's inbox folder 208. As indicated above, in one embodiment the enhanced managed email service may link the two instances of the same email (though in different folders: the user's inbox folder and the group folder) such that reading one will cause an update in user access status to the other. Alternatively, in another embodiment the enhanced managed email service does not link the two instances of the email and treats each separately. In regard to the two instances being linked and turning to FIG. 5C, assuming that the user reads the instance of the newly received email 502 in the user's inbox 208, as shown in the email viewing pane 206, the count for new email items in the inbox 208 and the corresponding group folder 304 are both decreased.

Figure 6:
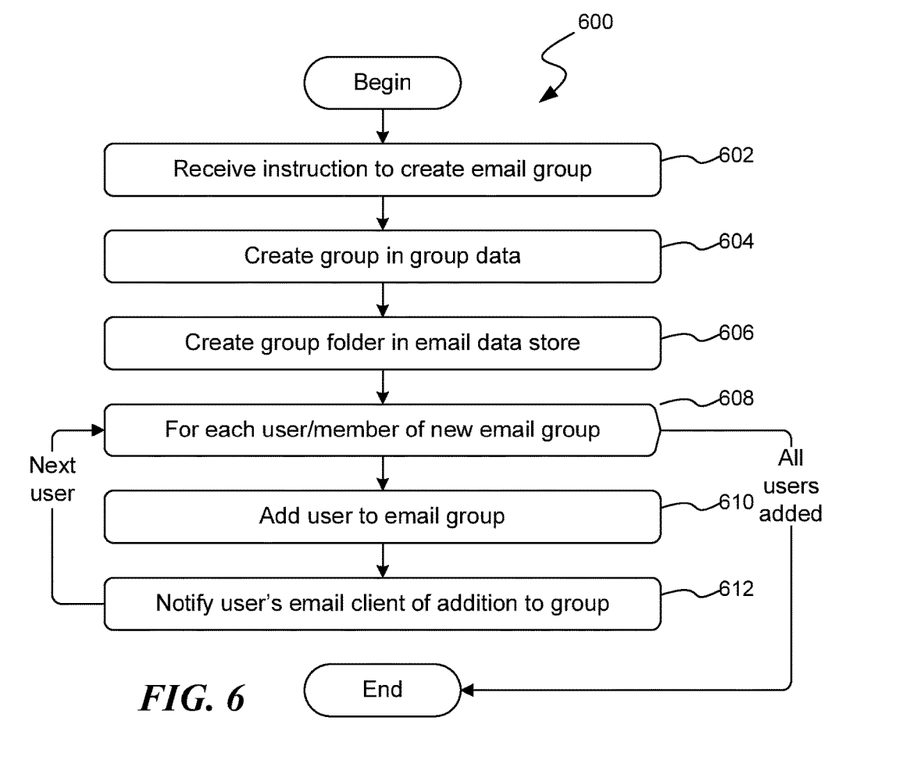
FIG. 6 is a flow diagram illustrating an exemplary routine for creating an email group on an enhanced managed email service.

Turning now to FIG. 6, FIG. 6 is a flow diagram illustrating an exemplary routine 600 for creating an email group on an enhanced managed email service. Beginning at block 602, an instruction is received to create an email group. As will be readily appreciated, the request may include, by way of illustration and not limitation, information such as the name of the email group, members of the email group, administrator information, and the like. At block 604, the enhanced managed email service creates/defines the email group per the received request. At block 606, a group folder corresponding to the newly defined/created email group is created in an email data store maintained by the enhanced managed email service. At block 608, an iteration loop is begun to add each identified user (from the request) to the newly created email group. Thus, at block 610, the next user is added to the email group. At block 612, the email client of the newly added user is notified regarding the addition of the user to the email group, causing a group folder corresponding to the new email group. Thereafter, the routine 600 returns to block 608 to process the next identified member to be added to the email group. This iteration continues until all identified members of the email group are processed. Thereafter, the routine 600 terminates.

Figure 7:
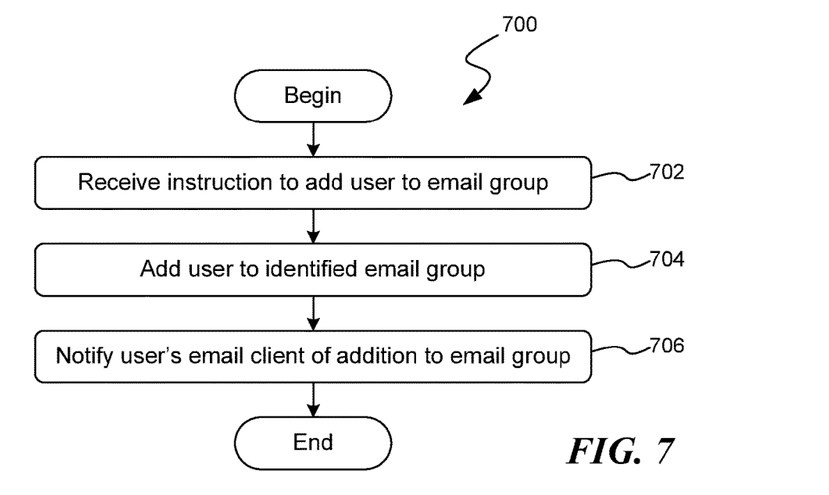
FIG. 7 is a flow diagram illustrating an exemplary routine for adding a user (or a group) as a member of an email group.

Turning to FIG. 7, FIG. 7 is a flow diagram illustrating an exemplary routine 700 for adding a user (or a group) as a member of an email group. Beginning at block 702, an instruction is received to add a user to an existing email group. At block 704, the user is added to the identified email group. At block 706, the email client of the newly added user is notified regarding the addition of the user to the email group, causing a group folder corresponding to the new email group to be displayed by the user's email client. Thereafter, the routine 700 terminates.

Regarding routines 100, 600 and 700 described above, as well as any other processes describe herein, while these routines/processes are expressed in regard to discrete steps, these steps should be viewed as being logical in nature and may or may not correspond to any actual and/or discrete steps of a particular implementation. Also, the order in which these steps are presented in the various routines and processes, unless otherwise indicated, should not be construed as the only order in which the steps may be carried out. In some instances, some of these steps, including those identified as being optional, may be omitted. Those skilled in the art will recognize that the logical presentation of steps of a routine or process is sufficiently instructive to carry out aspects of the claimed subject matter irrespective of any particular language in which the logical instructions/steps are embodied.

Of course, while these routines and processes include various novel features of the disclosed subject matter, other steps (not listed) may also be carried out in the execution of the subject matter set forth in these routines and processes. Those skilled in the art will appreciate that the logical steps of these routines/processes may be combined together or be comprised of multiple discrete steps. Steps of the above-described routines and processes may be carried out in parallel or in series. Often, but not exclusively, the functionality of the various routines and processes is embodied in software (e.g., applications, system services, libraries, executable modules, and the like) that is executed on one or more processors of computing devices, such as the computing device described below in regard FIG. 8. Additionally, in various embodiments all or some of the various routines may also be embodied in executable hardware modules including, but not limited to, system on chips, codecs, specially designed processors and or logic circuits, digital signal processors, and the like on a computer device or system.

As indicated, these routines/processes are typically embodied within executable code modules comprising routines, functions, looping structures, selectors such as if-then and if-then-else statements, assignments, arithmetic computations, and the like. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines and processes embodied within applications (also referred to as computer programs), apps (small, generally single or narrow purposed, applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed, the execution thereof causes, configures and/or adapts the executing computing device (or devices) to carry out various steps, methods and/or functionality, including those steps, methods, routines and processes described above. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may, in operation, deliver computer-executable instructions and/or data stored on the media to a computing device for execution via various transmission means and mediums, including transmission over carrier waves and/or propagated signals, for purposes of this disclosure computer readable media expressly excludes carrier waves and/or propagated signals.

Figure 8:
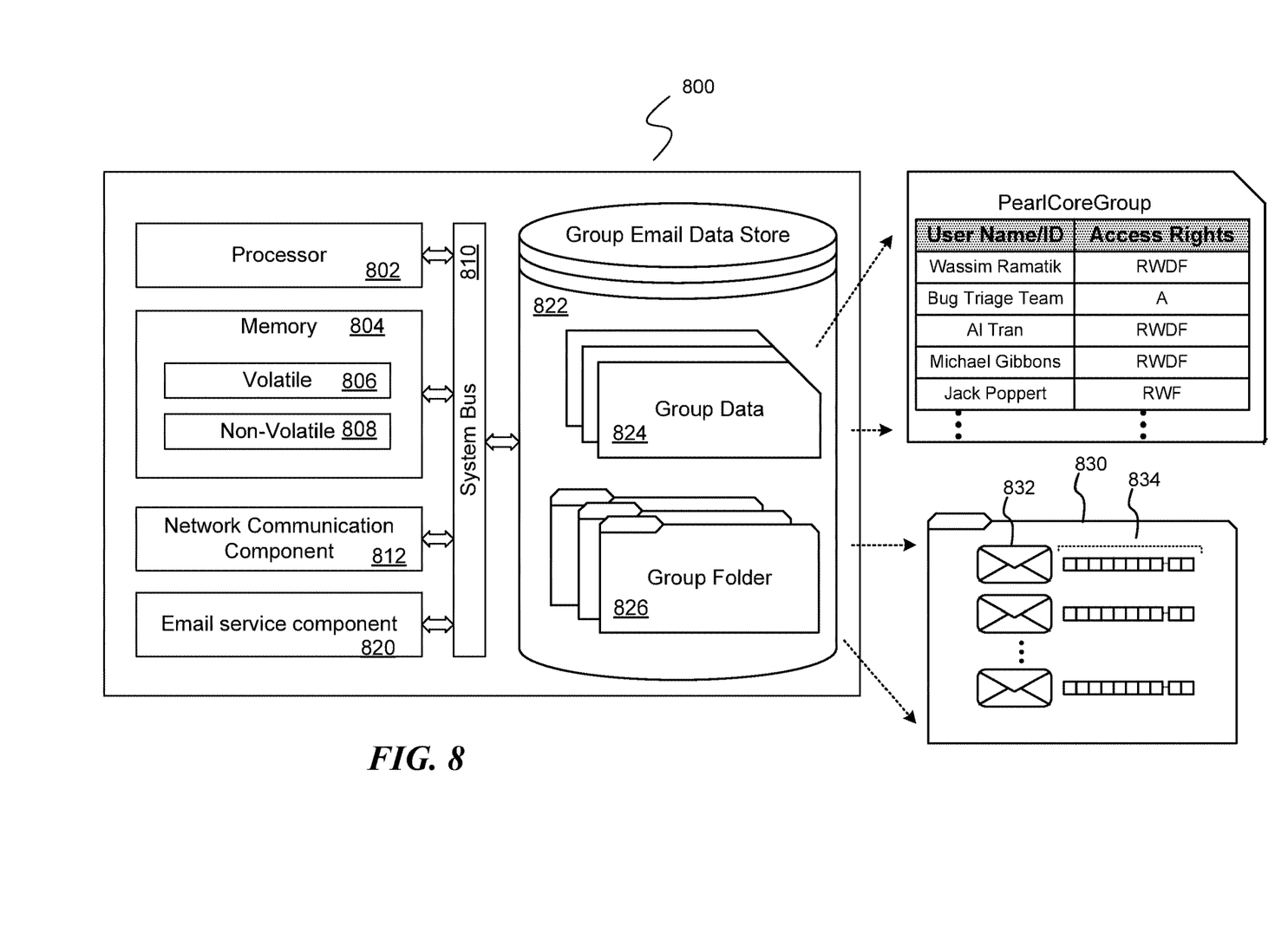
FIG. 8 is a block diagram illustrating exemplary components of an enhanced managed email service, as implemented on a computing device.

Turning now to FIG. 8, FIG. 8 is a block diagram illustrating exemplary components of an enhanced managed email service 800, as implemented on a computing device. The exemplary enhanced managed email service 800 includes one or more processors (or processing units), such as processor 802, and a memory 804. The processor 802 and memory 804, as well as other components, are interconnected by way of a system bus 810.

The memory 804 typically (but not always) comprises both volatile memory 806 and non-volatile memory 808. Volatile memory 806 retains or stores information so long as the memory is supplied with power. In contrast, non-volatile memory 808 is capable of storing (or persisting) information even when a power supply is not available. Generally speaking, RAM and CPU cache memory are examples of volatile memory 806 whereas ROM, solid-state memory devices, memory storage devices, and/or memory cards are examples of non-volatile memory 808.

Figure 9:
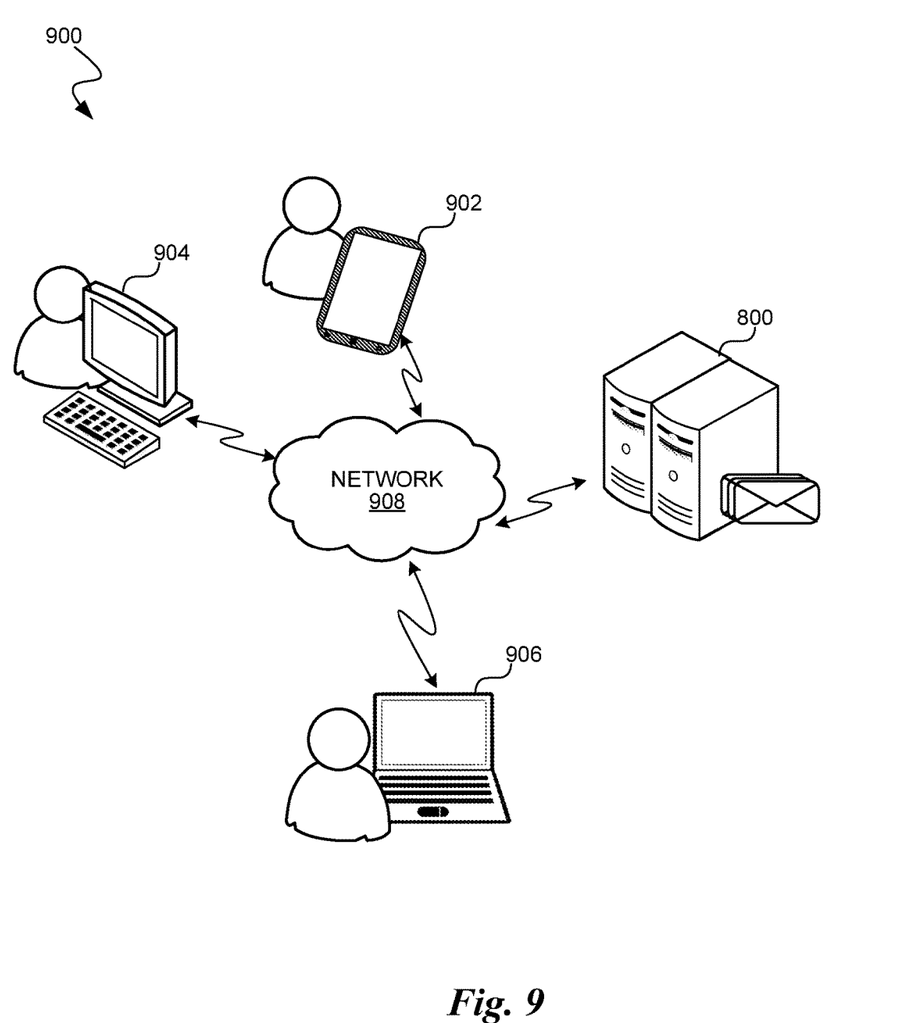
FIG. 9 is a block diagram illustrating an exemplary network environment suitable for implementing an enhanced managed email service.

The exemplary enhanced managed email service 800 further includes a network communication component 812 for interconnecting this managed email service with other devices over a computer network, such as user computing devices 902-906 communicating over network 908 as set forth in FIG. 9. The network communication component 812, which is sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 812, is typically comprised of hardware and/or firmware components (and may also include or comprise executable software components) that transmit and receive digital and/or analog signals over a transmission medium (i.e., the network.)

As will be readily appreciated, the processor 802 executes instructions retrieved from the memory 804 (and/or from computer-readable media) in carrying out various functions, particularly in regard to responding to a single entity intent search query. The processor 802 may be comprised of any of a number of available processors such as single-processor, multi-processor, single-core units, and multi-core units.

In addition to the components described above, the enhanced managed email service 800 includes an email service component 820 that implements typical managed email services as modified per the discussion and described above. In particular, the email service component 820 directs emails to the inboxes of specifically-identified users and maintains a single copy of an email directed to an email group in a corresponding group folder. Further, the email service component 820 maintains user status with regard to each item of email in the group folder for each of the members of the corresponding email group. The email service component 820 utilizes and maintains a group email data store 822 that includes group data 824 regarding the email groups defined on the enhanced managed email service, as well as group folders 826 for each of the defined email groups. The group data 824 includes information such as (by way of illustration) the email group name, a list of users, privileges of each user (including, by way of illustration and not limitation, administrative privileges, read/write abilities, delete abilities, security restrictions), and the like. Each of the group folders 826, such as group folder 830, includes email items sent to the corresponding email group, such as email item 832, as well as user status records corresponding to each email item for each of the members of the email group, as indicated by user status records 834. Information (not shown) that links an email in an inbox to an email in the group folder is also included with each of the emails in the group folder.

Regarding the various components of the exemplary enhanced managed email service 800, those skilled in the art will appreciate that these components may be implemented as executable software modules stored in the memory of the computing device, as hardware modules and/or components (including SoCs—system on a chip), or a combination of the two. Moreover, in certain embodiments each of the various components may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network.

Turning now to FIG. 9, FIG. 9 is a block diagram illustrating an exemplary network environment 900 suitable for implementing an enhanced managed email service 800. The exemplary network environment 900 includes user computing devices, such as user computing devices 902-906 communicating with the enhanced managed email service 800 over a computer network, such as network 908. The network may include the Internet, a wide area network or WAN, a local area network or LAN, and the like. As will be appreciated, email client applications executing on the various user computing devices 902-906 interconnected the enhanced managed email service 800 in receiving email information for a corresponding user, and in sending email to other users including users managed by the enhanced managed email service 800 as well as other email services.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for managing email directed to a defined email group by an enhanced managed email service, the method comprising:
   receiving an email for distribution to recipients managed by the enhanced managed email service;
   determining whether the email is directed to an email group managed by the enhanced managed email service; and
   upon determining that the email is directed to an email group managed by the enhanced managed email service:
      storing the email in a group folder common to the members of the email group such that the members of the email group that are referentially-identified have access to the received email via the group folder;
      identifying a first specifically-identified user of the received email, wherein the first specifically-identified user of the received email is also a member of the email group;
      storing the email in a folder associated with the first specifically-identified user other than the group folder;
      linking the received email in the specifically-identified user's folder with the received email in the group folder such that an access of the received email in the group folder by the first specifically-identified user causes a corresponding update to the received email in the specifically-identified user's email folder; and
      providing an indication to the members of the email group of the received email.

2. The computer implemented method of claim 1 further comprising setting an initial user access status for the received email for each of the members of the email group.

3. The computer implemented method of claim 2 further comprising:
   identifying one or more specifically identified users of the received email including the first specifically-identified user; and
   for each of the one or more specifically identified users:
      storing the email in an email folder associated with each of the one or more specifically identified users, such that each of the one or more specifically identified users have access to the received email via a user's email folder.

4. The computer implemented method of claim 3, wherein the one or more specifically identified users comprise one or more users identified in a "To" distribution list associated with the received email.

5. The computer implemented method of claim 4, wherein the one or more specifically identified users further comprise one or more users identified in a "CC" distribution list associated with the received email.

6. The computer implemented method of claim 5, wherein the one or more specifically identified users comprise one or more users identified in a "BCC" distribution list associated with the received email.

7. The computer implemented method of claim 5, wherein the one or more specifically identified users comprise one or more users identified in any one or more of a "To" distribution list, a "CC" distribution list, and a "BCC" distribution list associated with the received email.

8. The computer implemented method of claim 3 further comprising:
   for each of the one or more specifically identified users of the received email:
      linking the received email in a user's email folder with the received email in the group folder such that access of the received email in the user's email folder or the group folder causes an update to the user's user access status in both the user's email folder and the group folder.

9. The computer implemented method of claim 3 further comprising:
   receiving an indication of an access of the received email in the group folder by a first member of the email group; and
   updating the user access status in the group folder corresponding to the first member of the email group to reflect the first member's access of the received email in the group folder;
   wherein updating the user access status in the group folder corresponding to the first member of the email group does not modify the user access status in the group folder corresponding to a second member of the email group.

10. The computer implemented method of claim 3 further comprising:
   receiving an instruction to add a new member to the email group;
   adding the new member to the email group;
   providing access to the new member of the email group to the group folder; and
   setting an initial access for the new member of the email group for each email in the group folder.

11. A computer readable medium bearing computer executable instructions which, when executed on a computing system comprising at least a processor, carry out a method for managing email directed to a defined email group, the method comprising:
   receiving an email for distribution to recipients managed by the enhanced managed email service;
   determining whether the email is directed to an email group managed by the enhanced managed email service; and
   upon determining that the email is directed to an email group managed by the enhanced managed email service:
      storing the email in a group folder common to the members of the email group such that the members of the email group that are referentially-identified have access to the received email via the group folder;
      setting an initial user access status for the received email in the group folder for each of the members of the email group;
      identifying a first specifically-identified user of the received email, wherein the first specifically-identified user of the received email is also a member of the email group;
      storing the email in a folder associated with the first specifically-identified user other than the group folder;

linking the received email in the specifically-identified user's folder with the received email in the group folder such that an access of the received email in the group folder by the first specifically-identified user causes a corresponding update to the received email in the specifically-identified user's email folder; and
sending a notification to the members of the email group informing them of the received email.

12. The computer readable medium of claim 11, wherein the method further comprises:
identifying one or more specifically identified users of the received email; and
for each of the one or more specifically identified users:
storing the email in an email folder associated with each of the one or more specifically identified users, such that each of the one or more specifically identified users have access to the received email via a user's email folder.

13. The computer readable medium of claim 12, wherein the one or more specifically-identified users comprise one or more users identified in any one or more of a "To" distribution list, a "CC" distribution list, and a "BCC" distribution list associated with the received email.

14. The computer readable medium of claim 13, wherein the method further comprises:
for each of the one or more specifically identified users of the received email, including the first specifically-identified user:
linking the received email in a user's email folder with the received email in the group folder such that access of the received email in the user's email folder or the group folder causes an update to the user's user access status in both the user's email folder and the group folder.

15. The computer readable medium of claim 11, wherein the method further comprises:
receiving an indication of an access of the received email in the group folder by a first member of the email group; and
updating the user access status in the group folder corresponding to the first member of the email group to reflect the first member's access of the received email in the group folder;
wherein updating the user access status in the group folder corresponding to the first member of the email group does not modify the user access status in the group folder corresponding to a second member of the email group.

16. The computer readable medium of claim 11, wherein the method further comprises:
receiving an instruction to add a new member to the email group;
adding the new member to the email group;
providing access to the new member of the email group to the group folder; and
setting an initial access for the new member of the email group for each email in the group folder including the received email.

17. A computer system implementing an enhanced managed email service, the system comprising a processor and a memory, wherein the processor executes instructions stored in the memory as part of or in conjunction with additional components provide functionality of the enhanced managed email service, the additional components comprising:
an email service component; and
a group email data store;
wherein the email service component is configured to, upon receiving an email to recipients managed by the enhanced managed email service:
determine whether the received email is directed to an email group managed by the enhanced managed email service;
upon determining that the email is directed to an email group managed by the enhanced managed email service:
store the email in a group folder common to the members of the email group in the group email data store such that the members of the email group that are referentially-identified by the received email have access to the received email via the group folder; and
set an initial user access status for the received email in the group folder for each of the members of the email group;
identify a first specifically-identified user of the received email, wherein the first specifically-identified user of the received email is also a member of the email group;
store the email in a folder associated with the first specifically-identified user other than the group folder;
link the received email in the specifically-identified user's folder with the received email in the group folder such that an access of the received email in the group folder by the first specifically-identified user causes a corresponding update to the received email in the specifically-identified user's email folder; and
send a notification to the members of the email group informing them of the received email.

18. The computer system of claim 17, wherein the email service component is further configured to, upon determining that the email is directed to an email group managed by the enhanced managed email service:
identify one or more specifically identified users of the received email; and
for each of the one or more specifically identified users:
store the email in an email folder associated with each of the one or more specifically identified users, such that each of the one or more specifically identified users have access to the received email via a user's email folder.

19. The computer system of claim 18, wherein the email service component is further configured to, upon receiving an indication of an access of the received email in the group folder by a first member of the email group:
update the user access status in the group folder corresponding to the first member of the email group to reflect the first member's access of the received email in the group folder;
wherein updating the user access status in the group folder corresponding to the first member of the email group does not modify the user access status in the group folder corresponding to a second member of the email group.

20. The computer system of claim 19, wherein the email service component is further configured to, upon receiving an instruction to add a new member to the email group:
add the new member to the email group;
provide access to the new member of the email group to the group folder; and set an initial access for the new member of the email group for each email in the group folder including the received email.

* * * * *